(12) United States Patent
Mori (10) Patent No.: US 6,479,748 B2
(45) Date of Patent: Nov. 12, 2002

(54) GROMMET FOR A DOOR

(75) Inventor: Keisuke Mori, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 27 days.

(21) Appl. No.: 09/735,549

(22) Filed: Dec. 14, 2000

(65) Prior Publication Data

US 2001/0006113 A1 Jul. 5, 2001

(30) Foreign Application Priority Data

Dec. 14, 1999 (JP) .......................................... 11-354235

(51) Int. Cl.$^7$ ................................................ H02G 3/18
(52) U.S. Cl. ................ 174/65 G; 174/135; 174/152 G; 174/153 G; 248/56; 16/2.1
(58) Field of Search ........................... 174/65 G, 65 SS, 174/152 G, 153 G, 135, 151, 65 R, 68.1, 68.3, 72 A; 248/56; 16/2.1, 2.2; 361/826

(56) References Cited

U.S. PATENT DOCUMENTS

| | | | |
|---|---|---|---|
| 5,405,672 A | | 4/1995 | Takiguchi et al. |
| 5,588,260 A | | 12/1996 | Suzuki et al. |
| 5,806,139 A | * | 9/1998 | Anderson et al. ............. 16/2.1 |
| 6,150,608 A | * | 11/2000 | Wambeke et al. ........ 174/65 G |
| 6,218,625 B1 | * | 4/2001 | Pulaski ..................... 248/56 X |
| 6,240,597 B1 | * | 6/2001 | Mochizuki ................... 16/2.1 |
| 6,303,869 B1 | * | 10/2001 | Shanahan et al. ....... 174/153 G |

FOREIGN PATENT DOCUMENTS

| | | |
|---|---|---|
| EP | 0888930 | 1/1999 |
| JP | 7-179156 | 7/1995 |
| JP | 8-40155 | 2/1996 |
| JP | 9-76837 | 3/1997 |

OTHER PUBLICATIONS

English Language Abstract of JP–8–40155.
English Language Abstract of JP 9–76837.
English Language Abstract of JP 7–179156.

* cited by examiner

*Primary Examiner*—Dean A. Reichard
*Assistant Examiner*—Dhiru R Patel
(74) *Attorney, Agent, or Firm*—Greenblum & Bernstein, P.L.C.

(57) ABSTRACT

A grommet for a door is provided with a door mounting base portion, an automobile mounting base portion and a bellows portion. The door mounting portion includes a front side portion, from which the bellows portion extends, a passenger compartment side portion, which includes a wire harness through-hole, and a wire harness protecting portion extending diagonally between the front side portion and the passenger compartment side portion. The vertical width of the grommet is made short to reduce an area of the grommet that is exposed to the exterior and that is overlapped with the weather strip. Due to the structure described above, the grommet can be efficiently mounted to the door body, and waterproofness can be ensured.

9 Claims, 6 Drawing Sheets

PRIOR ART

Fig.4(B)

PRIOR ART

Fig.5
PRIOR ART

GROMMET FOR A DOOR

BACKGROUND OF THE INVENTION

1. Field of Invention

This invention relates to a grommet for a door of an automobile. In particular, this invention relates to a grommet that improves waterproofness at a position where a wire harness is mounted to extend from an automobile body to a door body. This invention further relates to a method for mounting the grommet.

2. Description of Related Art

Since water travels along a glass that moves up and down, and intrudes into the interior of right and left door bodies of an automobile, a wire harness mounted to extend from the automobile body to the door body sometimes avoids the interior of the door body and passes through a passenger compartment side. The wire harness mounted as described above, passes through an opening provided in an inner plate portion, which is on a passenger compartment side of the door body, to provide a required connection. Further, a trim cover is mounted to cover an entire surface at the passenger compartment side of the inner plate portion of the door body so that the wire harness is prevented from being exposed to the exterior.

Figure 4A:
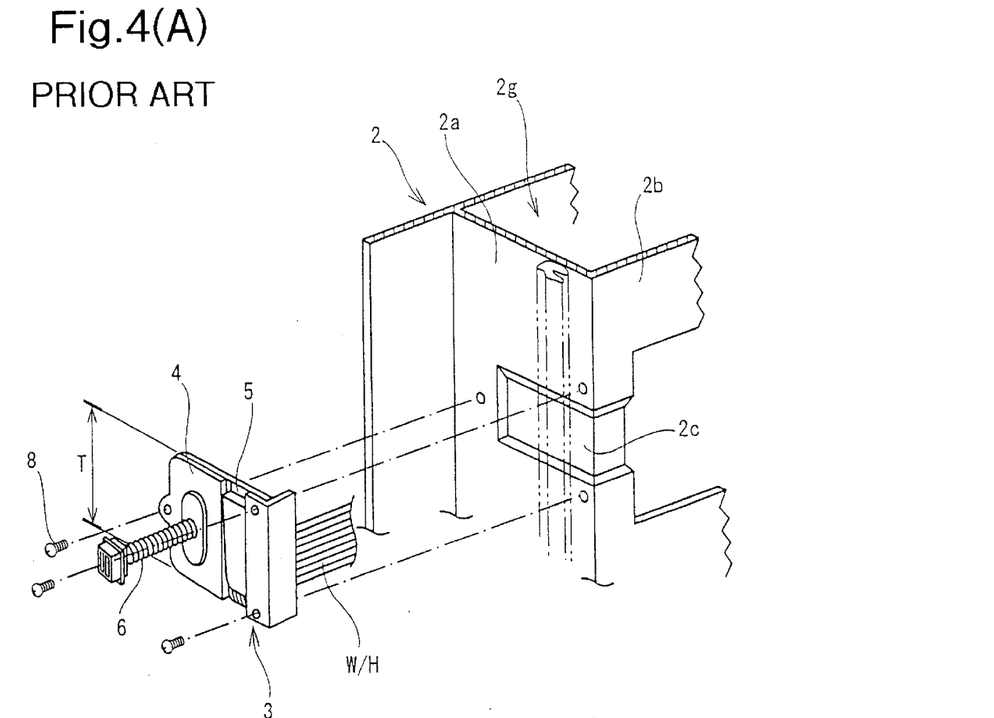
FIGS. 4(A) an 4(B), respectively, are a perspective view and a cross sectional view illustrating a conventional mounting structure of a wire harness.
Figure 4B:
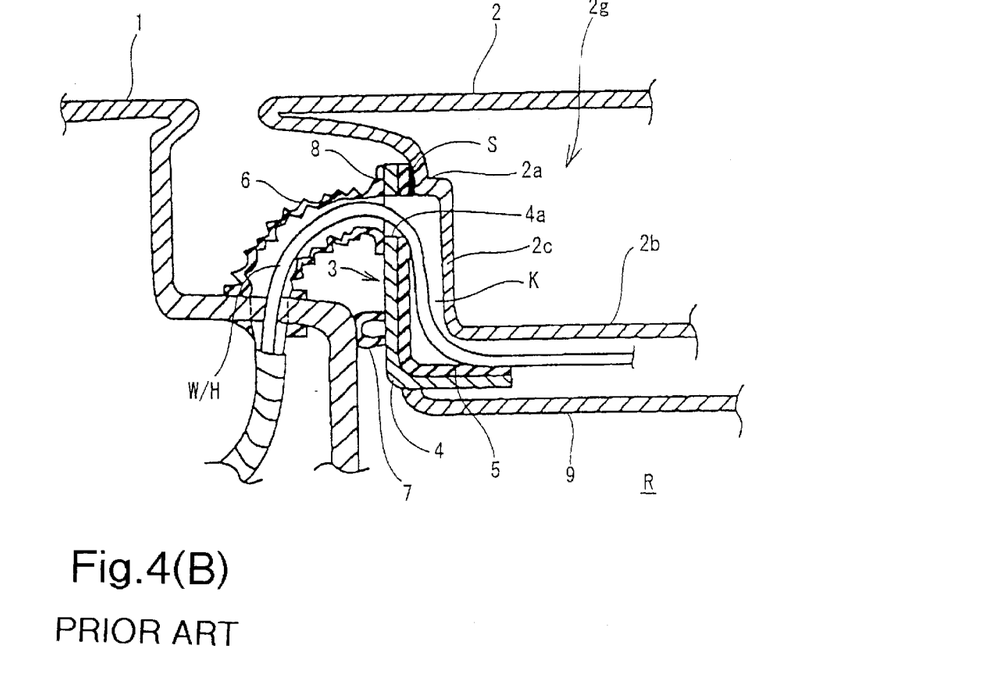

FIGS. 4(A) and 4(B) schematically show a mounting structure of a wire harness extending from the automobile body 1 to the passenger compartment side R of the door body, which is proposed by the Japanese Laid-Open Publication Nos. 7-179156 and 8-40155. In the mounting structure, an L-shaped recess 2c is formed to extend from a side plate portion 2a, which is a front side of the door body 2 and on which a hinge is attached, to an inner plate portion 2b at the passenger compartment side. Further, an attachment member 3 that covers the recess 2c is mounted by using bolts 8.

The attachment member 3 includes an L-shaped plate 4, such as an iron plate or a resin plate, which has a through-hole 4a, and a watertight packing 5 attached on the interior surface (facing the door body) of the L-shaped plate 4. Further, a grommet 6, in which a wire harness W/H is inserted, is mounted at the through-hole 4a. The wire harness W/H extending from the door side of the grommet 6 passes through a space K formed by the attachment member 3 and the recess 2c in the door body 2, and extends toward the passenger compartment side R of the inner plate portion 2b of the door body 2, so as not to pass through the interior 2g of the door body 2, where water is likely to intrude. Further, a weather strip 7 is provided on the side plate portion 2a of the door body 2 so as to pass over the attachment member 3. Further, after the completion of mounting the wire harness, a trim cover 9, which covers the inner plate portion 2b, is attached to the passenger compartment side R of the inner plate portion 2b of the door body 2.

Since the wire harness W/H provided as describe above is formed by bundling a predetermined number of wires, it has a constant (predetermined) cross section. Accordingly, in order to insert the wire harness W/H into the space K formed by the recess 2c of the door body 2 and the attachment member 3, the cross section of the space K should be made larger than the cross section of the wire harness W/H. To make the cross section of the space K larger, two avenues can be considered, i.e., increasing the depth of the recess 2c, or increasing the vertical width of the recess 2c. However, since the door body 2 is formed by press molding, machining to increase the depth of the recess is difficult and requires high cost. Thus, it is more realistic to increase the vertical width of the recess. Accordingly, the width in a vertical direction of the recess 2c is increased so that the wire harness W/H can be inserted therein.

When the vertical width of the recess 2c is increased, it is necessary to increase the vertical width of the attachment member 3, which covers the recess 2c. Generally, the vertical width T of the attachment member 3 is set between 120 and 150 mm. As a result, since an area in which the attachment member 3 is exposed to the exterior becomes large at the side plate portion 2a of the door body 2, the appearance becomes worse. Further, since the weather strip 7 attached on the side plate portion 2a cannot be directly attached to the door body 2 at the position where it crosses over the attachment member 3, the weather strip 7 might lose touch with the wide attachment member 3, and it becomes difficult to ensure waterproofness.

Further, since the attachment member 3 itself is provided with the L-shaped (iron) plate 4, the watertight packing 5 and the grommet 6, the number of parts is large, and thus, the cost becomes high. Further, since the attachment member 3 is mounted on the door body 2 by fastening with the bolts 8, the mounting operation takes a long time. Furthermore, because the path of the wire harness W/H to be mounted requires that it be bent about 90 degrees at two positions, i.e., at the side plate portion 2a and at the inner plate portion 2b of the door body 2, the mounting operation becomes difficult and cannot be performed efficiently. In addition, the wire harness W/H itself, when bent to such an extent, is subject to increased stress. Further, if a gap occurs at the contact point S between the watertight packing 5 and the side plate portion 2a, due to the vibration of the automobile body or age deterioration, etc., water intrudes and splashes on the wire harness W/H, a short or the like might occur in the worst case.

Figure 5:
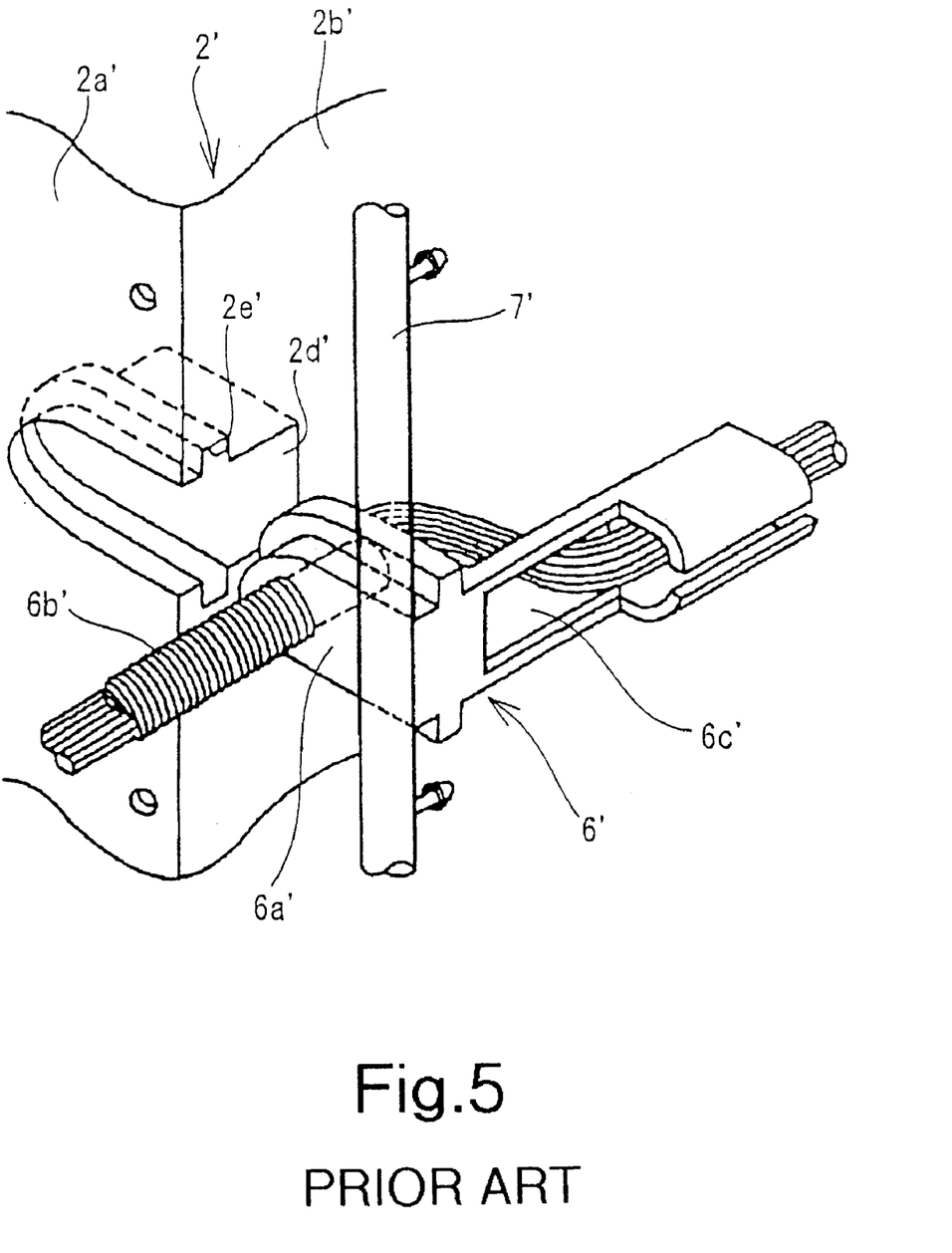
FIG. 5 is a perspective view illustrating another conventional mounting structure of a wire harness.

To solve the problem described above, Japanese Laid-Open Publication No.9-76837 proposed a mounting structure of a wire harness (note FIG. 5). In the mounting structure, an opening 2d' is continuously notched from a side plate portion 2a' to an inner plate portion 2b' in the passenger compartment side of the door body 2', and a recessed portion 2e' is provided at the periphery of the opening 2d' in the side plate portion 2a'. Further, a grommet 6', which is an attachment member of the wire harness, is integrally formed with a weather strip 7' and has an L-shape. A bellows portion 6b' extends from a front surface 6a' and the wire harness W/H passing through the bellows portion 6b' extends toward the side surface (passenger compartment side portion) 6c'.

In the attachment structure described above, since the weather strip 7' and the grommet 6' are formed unitarily in one piece as a single unit, waterproofness is ensured. Further, due to the engaging structure between the grommet 6' and the door body 2', the efficiency of mounting of the grommet 6' to the door body 2' improves. However, due to the unitary structure of the weather strip 7' and the grommet 6', a molding die becomes large and complicated, and the manufacturing costs for the die become very expensive. To engage with the grommet 6', the recessed portion 2e' is provided, which results in the shape of the cross section of the door body 2' being complicated. As a result, the cost of machining of the door body 2' becomes higher. Further, because the wire harness W/H is exposed to the exterior from the bellows portion 6b' to a passenger compartment side portion 6c', water that travels along a glass and intrudes into the interior of the door body 2' may splash on the wire harness W/H.

Accordingly, the present invention is provided in view of the above-described problems, and an objective of the present invention is to reduce the vertical width of the grommet mounted on the door body by diagonally mounting the wire harness from the front surface side to the passenger compartment side of the door body, so as to improve appearance when viewed from the outside and to improve waterproofness.

SUMMARY OF THE INVENTION

To achieve the above and/or other goals, the present invention provides a grommet for a door in which a wire harness to be mounted to extend from an automobile body to a door body is to be inserted. The grommet is configured to engage with an opening continuously provided in a front side and a passenger compartment side of the door body. The front side and the passenger compartment side connect with each other at a predetermined angle. The grommet includes a bellows portion into which the wire harness is to be inserted, a door mounting base portion, and an automobile mounting base portion configured to engage with the automobile body. The automobile mounting base portion extends past an end of the bellows portion. The door mounting base portion includes a front side portion from which the bellows portion extends and that covers the opening in the front side of the door body, a passenger compartment side portion that connects with the front side portion at the predetermined angle and covers the opening in the passenger compartment side of the door body and having a wire inserting through-hole, and a wire harness protecting portion that extends diagonally between the front side portion and the passenger compartment side portion so as to connect the bellows portion and the wire inserting through-hole. The wire harness is insertable into the wire harness protecting portion. The front side portion of the door mounting base portion may include a recessed portion on which a weather strip is mountable.

When the above-described grommet is mounted in an opening of the door body, which has little restriction to the depth thereof, and the wire harness is diagonally mounted, an area corresponding to the cross section of the wire harness can be secured to mount the wire harness, regardless of reducing the vertical width of the opening. Accordingly, the vertical width of the door mounting base portion of the grommet mounted to the door body can be short, and as a result, an area of the grommet exposed to the exterior can be reduced and the appearance can be improved. Further, due to the reducing of the vertical width, an area of the grommet over which the weather strip is mounted becomes short. Thus, the more portion of the weather strip can be mounted on the door body, and thus, the weather strip can be securely mounted, and can be prevented from separating from the door body, and waterproofness can be ensured.

In addition, since the grommet described above is provided with the door mounting base portion, the bellows portion and the automobile body mounting base portion unitarily formed in one piece as a single unit, a mounting operation can be performed easily. Further, since the wire harness W/H is covered by the wire harness protecting portion of the door mounting base portion even at the position from the front surface to the passenger compartment surface, the possibility that water will splash on the wire harness is reduced. Further, since the wire harness is diagonally mounted from the front surface to the passenger compartment surface to pass through the wire harness through-hole, the wire harness is bent at obtuse angles, and thus, an operation to insert the wire harness into the grommet can be performed easily.

Preferably, an engaging recessed portion to engage with the door body is provided in an entire periphery of the front side portion and the passenger compartment side portion, and a lip projects from an end of the engaging recessed portion about the entire periphery of the front side portion and the passenger compartment side portion. As described above, if the engaging recessed portion and the lip are provided in the door mounting base portion, the grommet, which engages with the opening (notch) of the door body, can be securely fixed by the engaging recessed portion, and waterproofness at the engaging position can be ensured by the lip.

Furthermore, preferably a drain hole is provided in the lip at the position of the recessed portion for the weather strip so that the drain hole extends between the engaging recessed portion and a bottom of the recessed portion for the weather strip. Due to the drain hole provided as described above, even if water passes through a gap between the weather strip and the grommet (or the door body), the water passes through the drain hole and is discharged into the interior of the door body via the engaging recessed portion. Thus, waterproofness can be ensured.

Preferably, a pair of drain holes are respectively provided in upper and lower lips of the door mounting base portion so that the door mounting base portion has a vertically symmetric structure. Due to the symmetric structure, the grommet for a door can be used with both right and left doors, and thus, parts can be efficiently used.

The present invention further provides a method for mounting the grommet by inserting the engaging recessed portion provided in the front side portion of the grommet into the opening in the front side of the door body along a guiding surface of the opening in the front surface, and pressing the engaging recessed portion provided in the passenger compartment side portion of the grommet into the opening in the side surface of the door body by deforming a portion of the wire harness protecting portion inwardly. According to this method for mounting the grommet, the conventional cumbersome mounting process can be avoided.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following with reference to figures.

FIG. 1 and FIGS. 2(A)–2(C) illustrate a grommet 10 for a door into which a wire harness to be mounted to extend between an automobile body and a door body 20 is inserted. The grommet 10 is unitarily formed to include a door mounting base portion 11 to be mounted on the door body 20, an automobile body mounting base portion 12 to be mounted on an automobile body, and a bellows portion 13 that extends between the door mounting base portion 11 and the automobile body mounting base portion 12. Alternatively, the above-described parts could be separately formed and interconnected in any suitable manner to form the grommet of the present invention. The door grommet 10 is made of any suitable material, such as a rubber or elastomer, which has flexibility and elasticity. The door body 20 on which the door grommet 10 is mounted has an L-shaped opening 20d continuously notched from the side plate portion 20a at the front side to the inner plate portion 20b at the passenger compartment side. Mounting holes 20f for mounting a weather strip 27 are provided in the side plate portion 20a with a small pitch.

The door mounting base portion 11 of the door grommet 10 is formed as a block so as to engage with the opening 20d of the door body 20. The vertical width T'(FIG. 2(C)) is shorter than the width of the conventional grommet, and is set to be, for example, about 50 mm in the present embodiment. In the condition where the door mounting base portion 11 is mounted in the opening 20d of the door body 20, a front side portion 14 is positioned to cover the opening 20d in the side plate portion 20a, which is positioned at a front surface side, and a passenger compartment side portion 15 is positioned to cover the opening 20d in the inner plate portion 20b, which is positioned at a passenger compartment surface side.

The front side portion 14 and the passenger compartment side portion 15 are connected at a right angle. The bellows portion 13, whose interior is hollow and into which the wire harness is inserted, extends from the surface of the front side portion 14 near an end portion 14a thereof. Further, a recessed portion 14c for mounting the weather strip 27 is provided on the surface of the front side portion near a connection side 14b. A wire harness through-hole 15b is provided near an end portion 15a of the passenger compartment side portion 15. The front side portion 14 and the passenger compartment side portion 15 are not required to connect at the right angle, rather the angle can be changed (adjusted) according to an angle between the side plate portion 20a and the inner plate portion 20b of the door body 20.

Further, the door grommet 10 has a wire harness protecting portion 16, which extends between the front side portion 14 and the passenger compartment side portion 15. The wire harness protecting portion 16 has an inserting portion 16a that diagonally extends between the hollow portion 13a, which protrudes from the front side portion 14 at the position aligning with the bellows portion 13, and the wire harness through-hole 15b in the passenger compartment side portion 15. The cross section of the inserting portion 16a has a generally circular shape and has a diameter larger than that of the wire harness inserted therein.

As described above, since the door mounting base portion 11 of the door grommet 10 has the inserting portion 16a with a predetermined cross sectional size and that diagonally extends from the front side portion 14 to the passenger compartment side portion 15, it has a large depth. However, since the door mounting base portion 11 is mounted to the opening 20d, which does not have a bottom surface, the grommet 10 can be mounted without interference. Further, since the door grommet 10 has a large depth so as to provide a cross section sufficient to insert the wire harness, the vertical width T' can be minimized, as described above.

Figure 1:
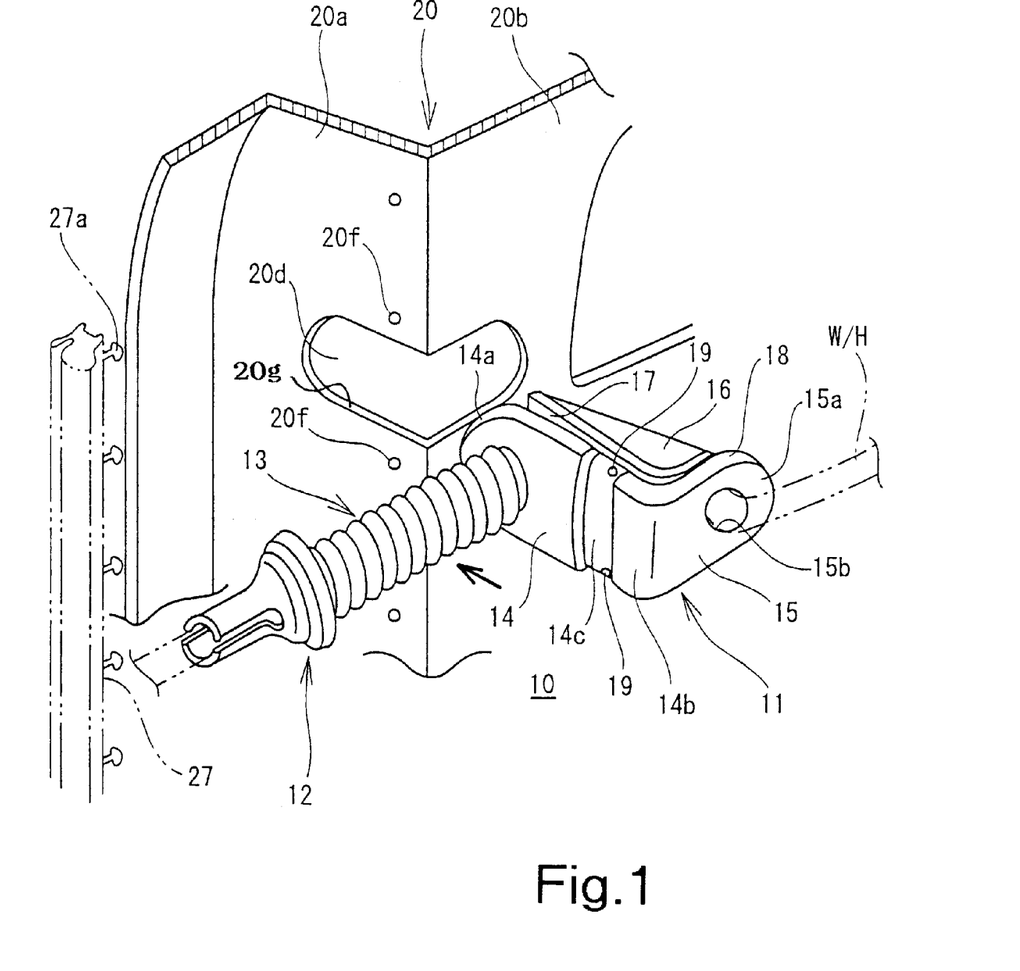
FIG. 1 is a perspective view illustrating a grommet for a door according to the present invention, at the time of mounting.
Figure 2A:
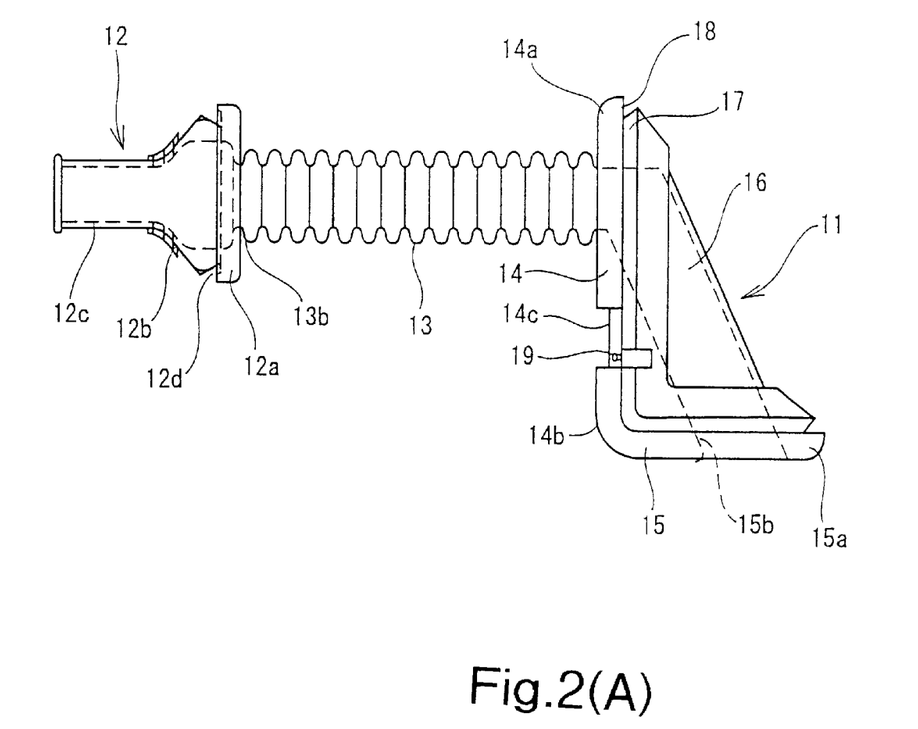
FIGS. 2(A)–2(C), respectively, are a front elevation view, a cross sectional view, and side elevation view illustrating the grommet according to the present invention FIGS. 3(A) and 3(B), respectively, are a cross sectional view and a perspective view illustrating the grommet for the door in an engaged condition.
Figure 2B:
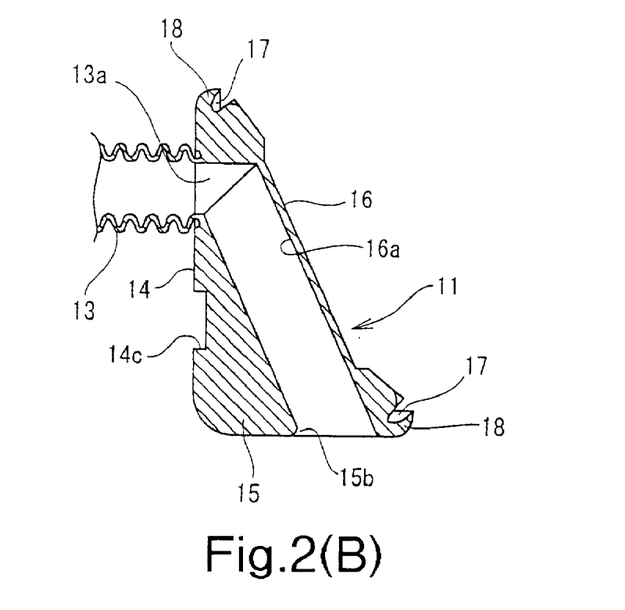
Figure 2C:
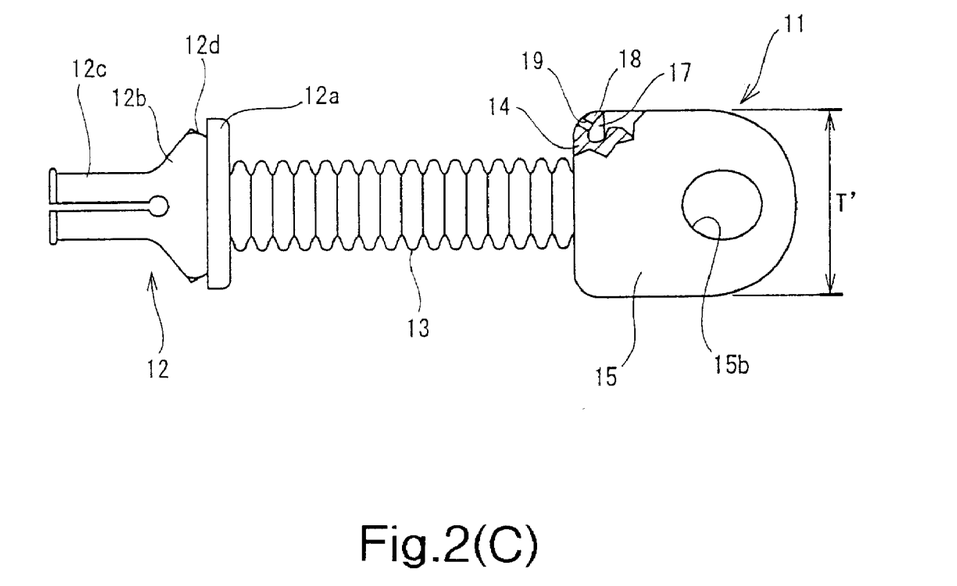

Further, the door grommet 10 has an engaging recessed portion 17 having a width corresponding to the plate thickness of the door body 20, about the entire periphery of the front side portion 14 and the passenger compartment side portion 15. Further, a lip 18 projects from an edge of the engaging recessed portion 17 provided in the entire periphery of the front side portion 14 and the passenger compartment side portion 15. Further, as shown in FIGS. 1, 2(A) and 2(C), the lip 18 has drain holes 19 opened at the position of the recessed portion 14c for mounting a weather strip. The drain holes 19 pierce the lip 18 from the front side portion 14 side to the engaging recessed portion 17 side. In the present embodiment, the drain holes 19 are provided at the position of the recessed portion 14c in both of the upper and lower lips 18, so that the door grommet 10 has a vertically symmetric structure, which can be used with both the right and left door bodies.

The length of the bellows portion 13 extending from the door mounting base portion 11 is determined according to the spacing between the door body 20 and the automobile body, when the door is opened. Further, the automobile body mounting base portion 12, which extends from the extended end portion 13b of the bellows portion 13, has a large-diameter portion 12a, a tapered portion 12c and a small-diameter portion 12c continuously formed from the bellows portion 13 side. A recessed portion 12d for engaging with the automobile body is provided between the large-diameter portion 12a and the tapered portion 12b.

When the wire harness W/H is mounted to extend from the automobile body to the door body 20 by using the above-described door grommet 10, first, during the manufacturing process of the wire harness W/H, the door grommet 10 is mounted on the wire harness W/H at the position for mounting on the door body 20. At this time, since the inserting portion 16a diagonally extends between the front side portion 14 and the passenger compartment side portion 15, an angle at a connection point of the front side portion 14 and the inserting portion 16a, and an angle at a connection point of the passenger compartment side portion 15 and the inserting portion 16a, become obtuse-angles, which are more than 90 degrees, and thus, the inserting operation for the wire harness becomes easy.

The door grommet 10 in which the wire harness W/H is inserted, is mounted on the door body 20, by engaging with the opening 20d provided in the door body 20, as shown in FIG. 1. More in detail, the engaging recessed portion 17 provided in the front side portion 14 is inserted into the opening 20d in the side plate portion 20a along a guiding surface 20g of the opening in the side plate portion 20a. In other words, the engaging recessed portion in the front side portion 14 is engaged with the guiding surface 20g of the opening in the side plate portion 20a. Then, the engaging recessed portion provided in the passenger compartment side portion 15 is pressed into the opening 20d in the inner plate portion 20b by deforming at least a portion of the inserting portion 16a of the wire harness protecting portion 16 inwardly. By mounting the grommet as described above, the grommet of the present invention can be easily mounted to the door body, and can avoid the conventional, cumbersome mounting process.

Figure 3A:
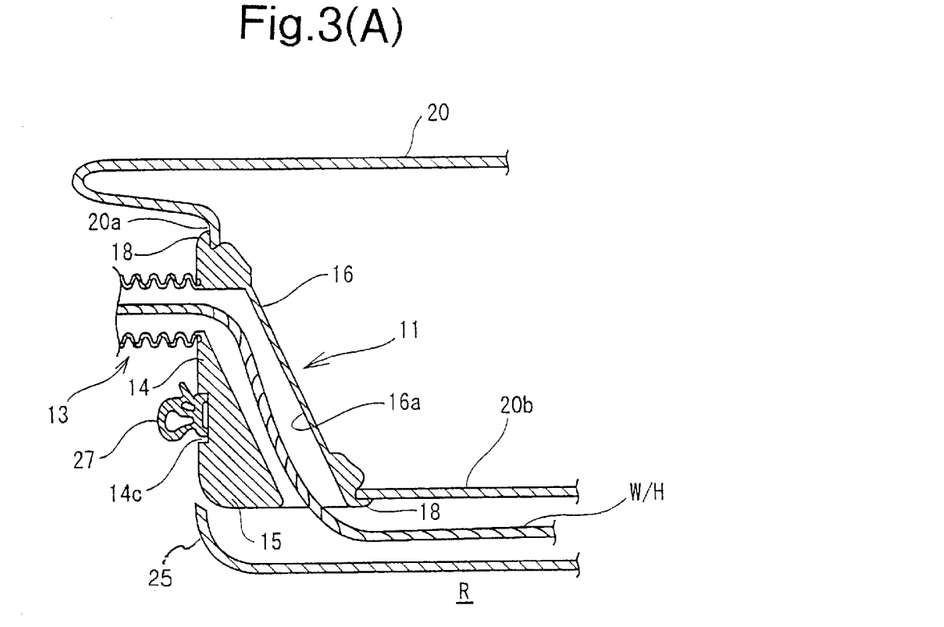
Figure 3B:
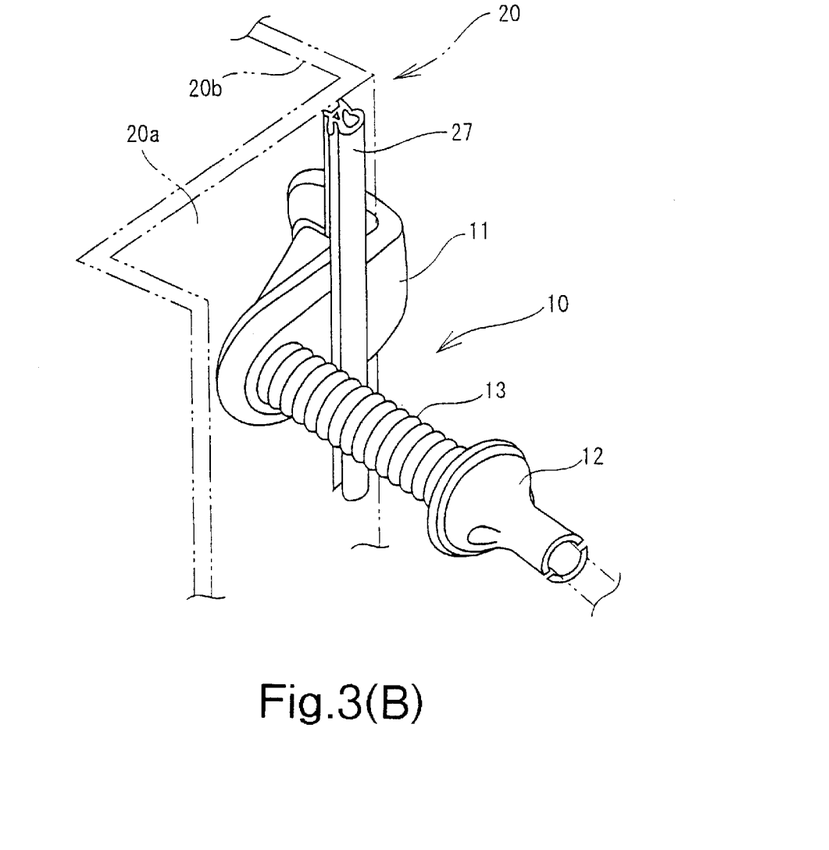

Since the opening 20d is provided by simply notching the side plate portion 20a and the inner plate portion 20b continuously, and no special machining is performed, there is no special (or particular) cost to form the opening 20d. Further, after the engagement, as shown in FIGS. 3(A) and 3(B), the lip 18 tightly contacts the side plate portion 20a and the inner plate portion 20b of the door body 20 so as to ensure an efficient seal at the engaging position. Further, since the front side portion 14 and the passenger compartment side portion 15 connect with each other at a right angle, they are mutually prevented from separating from the door body 20 in the engaged condition, and thus, the engaged condition can be securely maintained.

After the mounting of the door grommet 10, the weather strip 27 is mounted on the side plate portion 20a of the door body 20 and on the recessed portion 14c of the door grommet 10. At this time, since the vertical width of the door grommet 10 is short, the length of the weather strip 27 that crosses over the door grommet 10 becomes shorter than the conventional structure. Further, since the mounting holes 20f are provided with a short pitch, the weather strip 27 can be securely mounted, and thus, separation of the weather strip 27 from the upper and lower sides of the door grommet 10 can be reduced.

Further, a trim cover 25 (FIG. 3(A)) is provided to cover the entire surface of the passenger compartment side of the inner plate portion 20b of the door body 20, and thus the mounted wire harness W/H is prevented from being exposed to the exterior. The automobile body mounting base portion 12 of the door grommet 10 engages with an engaging hole (not shown) in the automobile body to perform a required connection of the mounted wire harness W/H. Thus, the wire harness W/H is naturally mounted in the passenger compartment side R of the door body 20 without being exposed to the exterior at the position between the automobile body and the door body.

Even if water from rain or a car wash passes through a door mounting side of the weather strip 27 at the position where the door grommet 10 is mounted, the water passes through the drain holes 19 toward the interior of the door body 20 via the engaging recessed portion 17. Thus, water intrusion into the passenger compartment is prevented, and the waterproofness is ensured. In addition, the size, the shape, etc., of the grommet of the present invention can be modified according to a variety of shapes of door bodies and automobile bodies, etc.

As clearly described above, according to the grommet for a door of the present invention, since the vertical width is minimized, the area exposed to the exterior is reduced when the grommet is mounted on the door, and thus, the deterioration of the appearance can be prevented. Further, the mounting efficiency of the weather strip on the door body can be improved, and the waterproofness can also be improved. In addition, since the door grommet itself is provided unitarily and in one piece as a single unit without combining with other parts, the manufacturing cost of the grommet can be reduced. In addition, since the mounting of the grommet to the door body can be performed without using bolts and so on, the mounting operation becomes efficient.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI 11-354235, filed on Dec. 14, 1999, which is herein expressly incorporated by reference in its entirety.

What is claimed is:

1. A grommet for a door, in which a wire harness to be mounted to extend from an automobile body to a door body is to be inserted, said grommet being configured to engage with an opening continuously provided in a front side and a passenger compartment side of the door body, the front side and the passenger compartment side connecting at a predetermined angle, said grommet comprising:

a bellows portion into which the wire harness to be inserted;

a door mounting base portion including
a front side portion from which said bellows portion extends, said front side portion covering the opening in the front side of the door body,
a passenger compartment side portion that connects with said front side portion at the predetermined angle, said passenger compartment side portion covering the opening in the passenger compartment side of the door body and having a wire inserting through-hole,
a wire harness protecting portion that diagonally extends between said front side portion and said passenger compartment side portion so as to connect said bellows portion and said wire inserting through-hole, the wire harness being insertable into said wire harness protecting portion; and an automobile mounting base portion configured to engage with the automobile body, said automobile mounting base portion extending past an end of said bellows portion.

2. The grommet according to claim 1, wherein said door mounting base portion further includes an engaging recessed portion to engage with the door body about an entire periphery of said front side portion and said passenger compartment side portion, and a lip that projects from an end of said engaging recessed portion at the entire periphery of said front side portion and said passenger compartment side portion.

3. The grommet according to claim 2, wherein said front side portion of said door mounting base portion includes a recessed portion on which a weather strip is mountable.

4. The grommet according to claim 3, further comprising a drain hole provided in said lip at the position of said recessed portion for the weather strip, said drain hole extending between said engaging recessed portion and a bottom of said recessed portion for the weather strip.

5. The grommet according to claim 4, wherein said drain hole comprises a pair of drain holes respectively provided in upper and lower lips of said door mounting portion so that said door mounting base portion is vertically symmetric, whereby said grommet is configured for use in either left or right side doors.

6. The grommet according to claim 1, wherein said predetermined angle of said grommet is a right angle.

7. The grommet according to claim 1, wherein said door mounting base portion, said bellows, and said automobile mounting base portion are formed unitarily and in one piece.

8. The grommet according to claim 7, wherein said grommet is formed of a resilient material.

9. A method for mounting the grommet of claim 2, comprising:

inserting said engaging recessed portion provided in said front side portion of said grommet into the opening in the front side of the door body along a guiding surface of the opening in the front surface; and pressing said engaging recessed portion provided in said passenger compartment side portion of said grommet into the opening in the passenger compartment side of the door body by deforming a portion of said wire harness protecting portion inwardly.

* * * * *